United States Patent [19]

Shimauchi

[11] Patent Number: 4,812,833
[45] Date of Patent: Mar. 14, 1989

[54] TOUCH PANEL INPUT DEVICE

[75] Inventor: Hiroshi Shimauchi, Owariasahi, Japan

[73] Assignee: Hitachi, Ltd., Tokyo, Japan

[21] Appl. No.: 55,547

[22] Filed: May 29, 1987

[30] Foreign Application Priority Data

May 30, 1986 [JP] Japan ................................. 61-123304

[51] Int. Cl.⁴ ............................................. G09G 1/00
[52] U.S. Cl. ..................... 340/712; 178/18;
341/23; 341/31; 341/33
[58] Field of Search ...................... 340/711, 712, 365 P, 340/365 C, 365 A, 365 R; 178/18

[56] References Cited

U.S. PATENT DOCUMENTS

| | | | |
|---|---|---|---|
| 3,673,327 | 6/1972 | Johnson et al. | 340/365 P |
| 4,186,392 | 1/1980 | Holz | 340/712 |
| 4,205,304 | 5/1980 | Moore | 340/365 P |
| 4,521,870 | 6/1985 | Babbel et al. | 340/712 |

FOREIGN PATENT DOCUMENTS 0124724 3/1985 Japan.
0250423 12/1985 Japan ................................ 340/365 P

OTHER PUBLICATIONS

R. H. Harris, –"Optical Overlay Input Device for a Cathode Ray Tube", –IBM Technical Disclosure Bulletin –vol. 24, No. 6, Nov./1981, –pp. 2732-2733.
P. Callens, –"Optical Keyboard Device and Technique", –IBM Technical Disclosure Bulletin –vol. 26, No. 6, Nov./83, pp. 2763-2764.

Primary Examiner—John W. Caldwell Sr.
Assistant Examiner—M. Fatahiyar
Attorney, Agent, or Firm—Fay, Sharpe, Beall, Fagan, Minnich & McKee

[57] ABSTRACT

A touch panel input device includes a sensor for detecting that an operator's finger has approached toward a touch input key, to prevent the operator from performing an erroneous key input operation. The sensor includes a multiplicity of optical element pairs each made up of a light emitting diode for emitting a light beam and a photodetector receiving the light beam from the light emitting element. Light beams generated by the optical element pairs are arranged in the form of a matrix to form a detection plane. When the operator's finger traverses the detection plane, a cursor is displayed on the display screen at a position corresponding to the position of the finger on the detection plane. Accordingly, the operator can correct the movement of the finger toward a desired key position by observing the cursor.

7 Claims, 5 Drawing Sheets

TOUCH PANEL INPUT DEVICE

BACKGROUND OF THE INVENTION

The present invention relates to a touch panel input device, and more particularly to a touch panel input device which can inform an operator of a position where a key will be pressed, before the operator presses the key, to improve the operability of the device.

In conventional touch panel input devices, an operator is informed of the position where a key has been pressed, that is, the position of a key which has been pressed, to detect an error in key operation and an erroneous input operation, thereby correcting such malfunctions.

For example, according to a method disclosed in Japanese patent application JP-A-60-124,724, when a key is pressed by an operator, that area of a display screen which is specified by the key, changes color for a predetermined time, to inform the operator that the key was pressed correctly.

According to the above method, a key operation is checked after a key has been pressed, but no attention is paid to the action of the operator at a time before the key is pressed. In more detail, an angular parallax caused by a gap between a curved display screen and the key input surface of a transparent, flat plate which is laid over the display screen, makes a precise key operation difficult. Thus, an area where a key is effectively operated, is limited, and the possibility of erroneous input operation becomes large as the effective area of the key is smaller.

SUMMARY OF THE INVENTION

It is an object of the present invention to provide a touch panel input device which can eliminate the above-mentioned drawback of the prior art, and in which an input key can be operated at a wide area to make small the possibility of erroneous input operation.

In order to attain the above object, according to an aspect of the present invention, a touch panel input device includes a sensor for detecting the position of a finger (or rod-shaped member) having come near a key input surface, before a key on a touch panel is operated, and displaying a cursor on the display screen of a color CRT display at a position corresponding to the position of the finger or rod-shaped member detected by the sensor.

When the finger or rod-shaped member is moved along the key input surface, the cursor displayed on the display screen moves thereon in accordance with the position of the finger or rod-shaped member detected by the sensor. Thus, that area of the display screen, which will be subjected to a key input operation, is previously indicated by the cursor. Accordingly, an operator can operate a key while confirming that area of the display screen, which will be subjected to the key input operation. Thus, it is possible to prevent the erroneous key operation due to the angular parallax and the erroneous input operation caused by pressing a plurality of input keys simultaneously.

Further, according to another aspect of the present invention, a sheet is disposed over a touch panel, to cause a finger to slide on the sheet in a state that the finger is kept in light contact with the sheet, during a period when an operator searches for a target key to be pressed. When the finger slides on the sheet, a cursor displayed on a display screen is moved thereon in accordance with the position of the finger. When an operator finds the target key, the sheet is pressed strongly by the finger, to perform a key input operation at the touch panel.

DESCRIPTION OF THE PREFERRED EMBODIMENTS

Now, explanation will be made of an embodiment of a touch panel input device according to the present invention, with reference to FIGS. 1 to 5.

Figure 1:
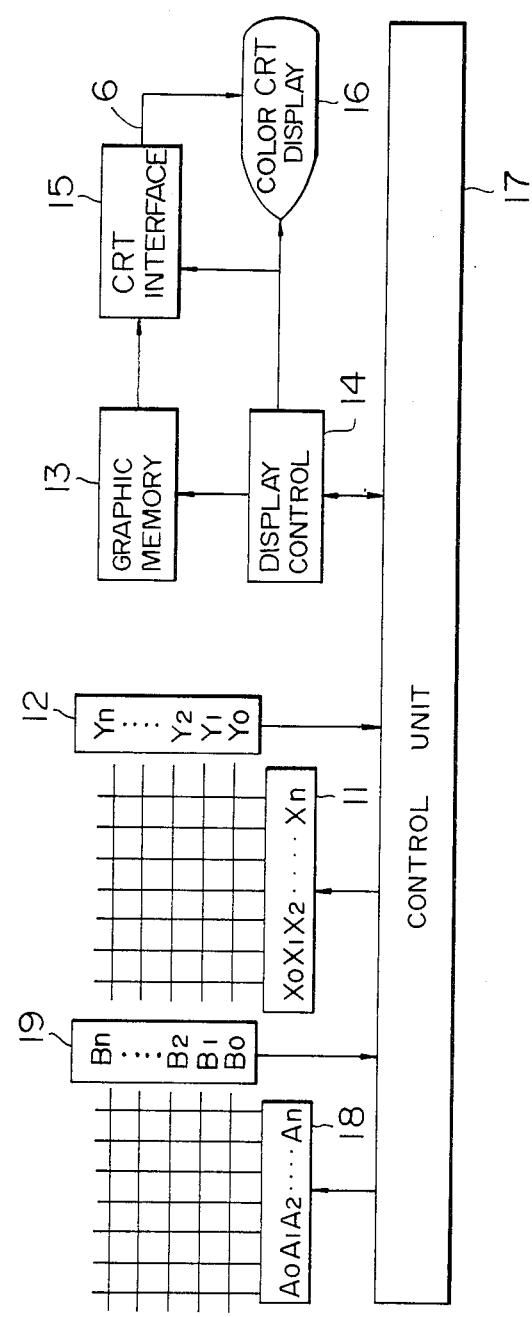
FIG. 1 is a block diagram showing the construction of an embodiment of a touch panel input device according to the present invention.
Figure 2A:
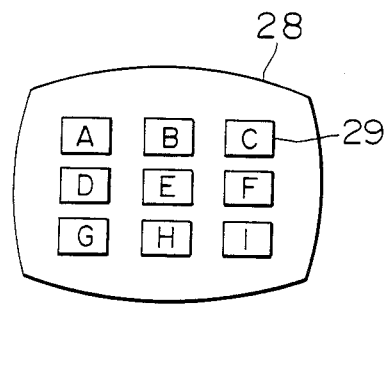
FIGS. 2a and 2b are schematic diagrams showing the display screen of the color CRT display of FIG. 1.
Figure 2B:
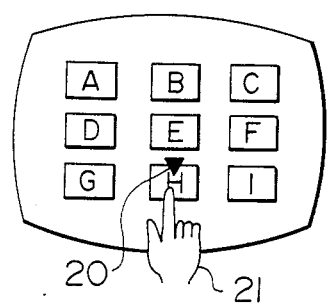
Figure 3:
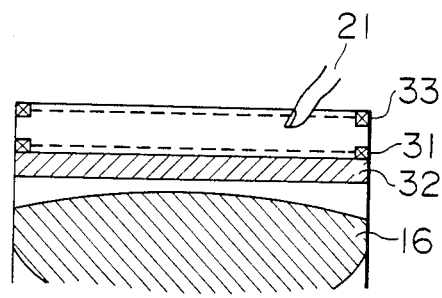
FIG. 3 is a sectional view showing an upper portion of the color CRT display of FIG. 1.

Referring to FIGS. 1 to 3, the present embodiment includes a control unit 17, a touch panel 32, a plurality of input display elements 29, first sensor 31 for detecting a finger or rod-shaped member inputting a display element 29, a key scanning circuit 18 and a key read-out circuit 19 for sensor 31, a second sensor 33 for detecting a touch input member such as a finger or rod-shaped member placed over the touch panel 32 to select a key input or display element 29, a sensor scanning circuit 11 for scanning the sensor 33 controllably, a sensor read-out circuit 12 for reading out the sensor 33 controllably, a color CRT display 16 disposed under the touch panel 32 for displaying predetermined patterns, a display control circuit 14 for controlling the display operation of the color CRT display 16, and a graphic memory 13.

Further, when an operator 21 places a finger or rod-shaped member over a key input display element 29, sensor 33 controls a cursor 20 for indicating this input portion is displayed on the display screen 28 of the color CRT display 16.

The operation of the present embodiment is controlled by the control unit 17.

Now, explanation will be made of the operation of the embodiment, with reference to FIGS. 1 to 5.

Figure 4:
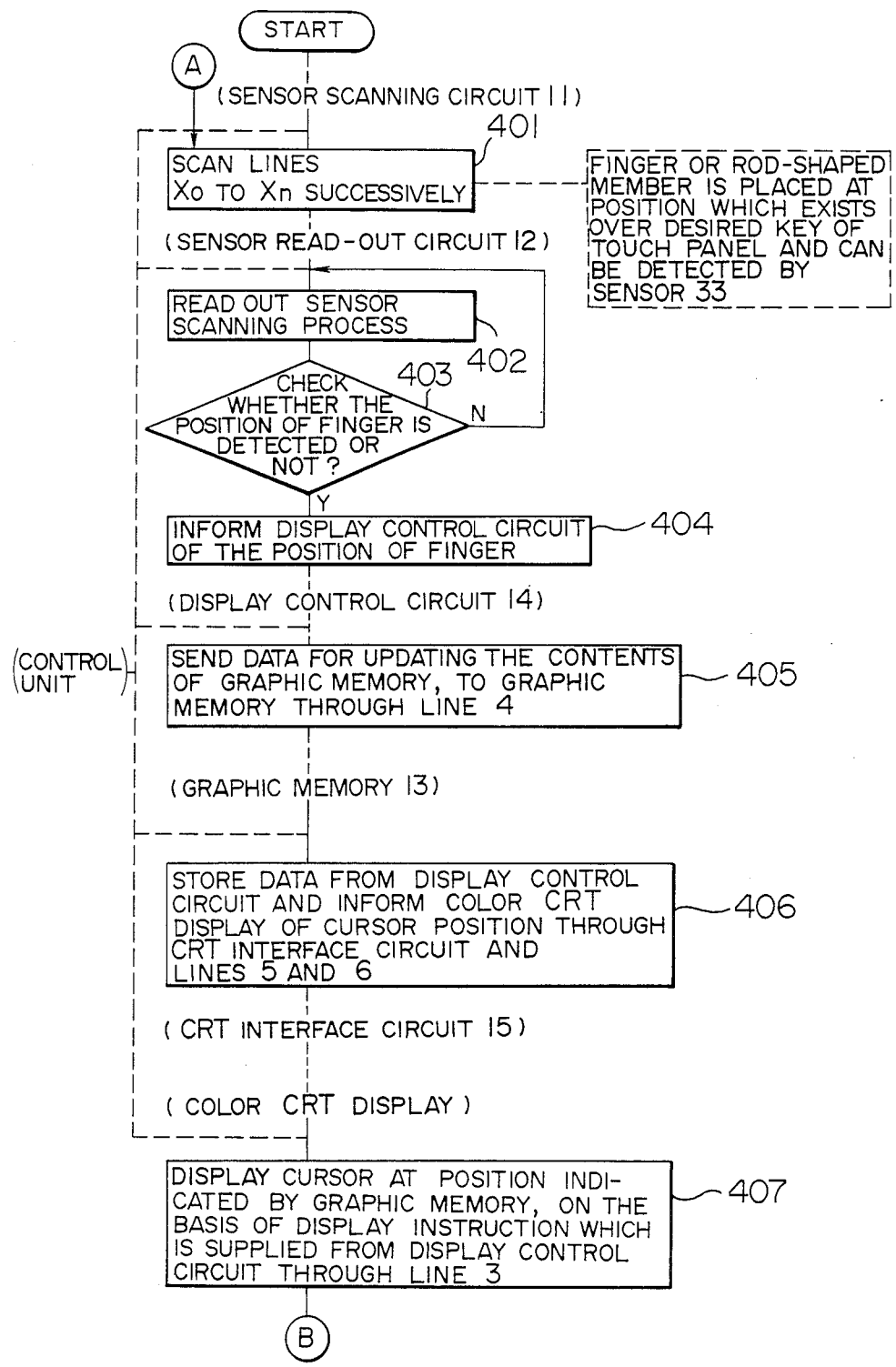
FIGS. 4 and 5 are a flow chart used to explain the operation of the above embodiment for displaying a cursor on the display screen of the color CRT display of FIG. 1.

First, the sensor scanning circuit 11 performs a scanning operation so that lines $X_0$ to $X_n$ are successively scanned, under the control of the control unit 17 (step 401 of FIG. 4). When the operator 21, as shown in FIG. 2b, places the finger or rod-shaped member at a position over the touch panel 32 that can be detected by the sensor 33, the sensor read-out circuit 12 reads out the scanning process carried out by the sensor scanning circuit 11 (step 402), and it is checked whether the position of the finger or rod-shaped member is detected or not (step 403). The control unit 17 informs the display control circuit 14 of the position of the finger or rod-shaped member (step 404). The display control circuit 14 sends data for updatating the contents of the graphic memory 13 in accordance with the position of the finger or rod-shaped member, to the graphic memory 13, and then instructs the color CRT display 16 to display the cursor having been moved to the above position (step 405). The graphic memory 13 stores the above data, and informs the color CRT display 16 of the position of the cursor through a CRT interface circuit 15 (step 406). The color CRT display 16 displays the cursor on the display screen at the position specified by the graphic memory, on the basis of the display instruction from the display control circuit 14 (step 407).

Figure 5:
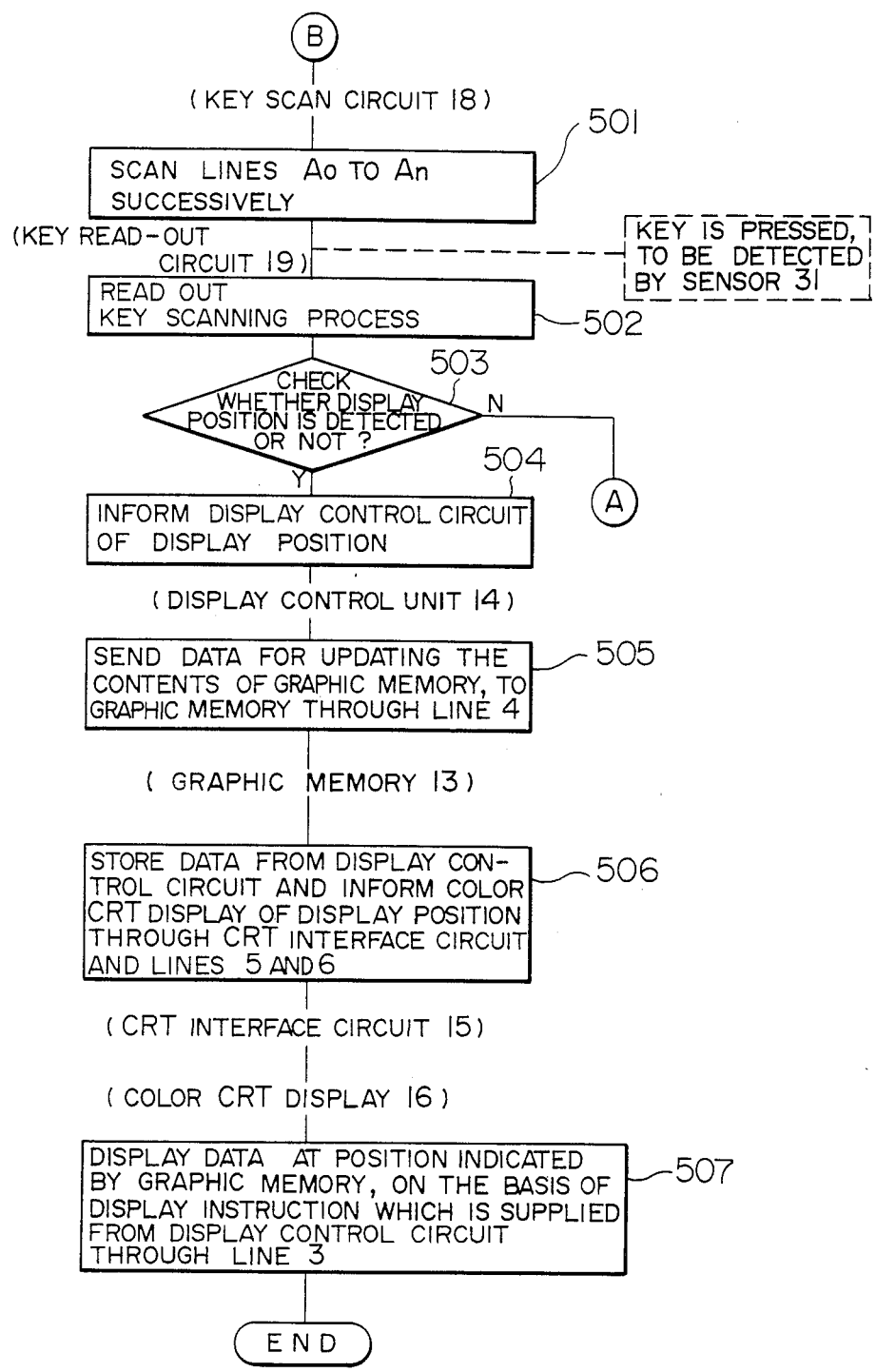

Further, a key input position on the touch panel 32 is displayed on the display screen 28 in accordance with the procedure shown in FIG. 5. That is, the key scanning circuit 18 performs a scanning operation so that lines $A_0$ to $A_n$ are successively scanned (step 501), and the key read-out circuit 19 reads out the scanning process carried out by the key scanning circuit 18 (step 502). Thus, in a case where a key is pressed, the position of the key is detected (step 503). The control unit 17 informs the display control circuit 14 of the position of the key (step 504). The display control circuit 14 sends data for updating the contents of the graphic memory 13 in accordance with the position of the key, to the graphic memory 13 (step 505). The graphic memory 13 stores the data, and informs the color CRT display 16 of the key position through the CRT interface circuit 15 (step 506). Thus, the above data is displayed on the display screen of the color CRT display 16 at a position corresponding to the key position (step 507).

As is evident from the above explanation, according to the present embodiment, the position of a key which will be pressed, can be previously indicated by the cursor.

Figure 6:
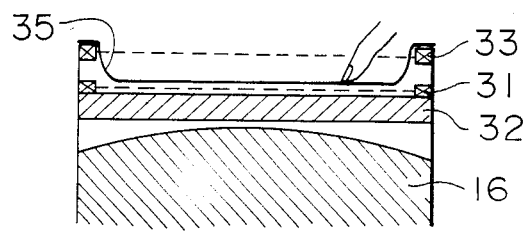
FIGS. 6 and 7 are sectional views showing an upper portion of a color CRT display used in another embodiment of a touch panel input device according to the present invention.
Figure 7:
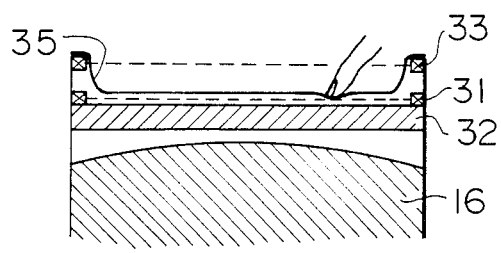

FIG. 6 shows an upper portion of a color CRT display used in another embodiment of a touch panel input device according to the present invention. Referring to FIG. 6, the above upper portion includes a touch sheet 35, in addition to a touch panel 32 and two sensors 31 and 33. The touch sheet 35 is disposed between two parallel matrix sensing planes each formed of light beams, which are generated by a corresponding one of the sensors, and made parallel to the matrix planes. The first and second sensors include a plurality of optical element pairs each made up of a light emitting a light beam and a photo-detector receiving the light beam from the light emitting element, the optical element pairs are arranged so that light beams generated by the optical element pairs lie on a plane and are divided into first parallel beams, second parallel beams and the first parallel beams intersect with the second parallel beams, to be able to detect the position of the finger or rod-shaped member. Unlike the touch panel 32, the touch sheet 35 is bent as shown in FIG. 7, when applied with a force of 50 to 100 gf by a finger. Thus, that portion of the sheet 35 pressed by the finger can intercept a light beam generated by the sensor 31. Further, the touch sheet 35 has elasticity, and hence can return to the initial flat state when the finger is removed from the sheet 35. That is, when an operator causes a finger to slide on the touch sheet in directions parallel to the display screen of the color CRT display 16 while keeping the finger in light contact with the touch sheet 35, a cursor can move on the display screen in accordance with the movement of the finger. Since a desired key is searched for in a state that the finger is kept in light contact with the touch sheet, it is unnecessary to concentrate the strength of an operator's arm to a finger for the purpose of suppressing the unintentional movement of the finger, and thus the fatigue of the arm and finger can be lessened. When the cursor reaches the position of the desired key, the finger is pressed strongly against the sheet 35, to intercept a light beam due to the sensor 31 by that portion of the sheet 35 pressed strongly by the finger.

The combination of the sensor 31 and the touch panel 32 may be replaced by other touch panels such as a resistance type touch panel, a pressure-sensitive type touch panel and an electrostatic capacitance type touch panel. Further, in order to lessen the fatigue of operator's eyes, the touch panel and/or the touch sheet may be made of a translucent material.

I claim:

1. A touch panel input device to be activated by a touch input member, comprising:
   display means for displaying images of a plurality of input display elements and selectively indicating an inputted one of the display elements;
   a transparent, flat panel disposed over said display means;
   first sensor means disposed at said flat panel for detecting the touch input member and thereby inputting the selected display element;
   second sensor means disposed over said flat panel and spaced from said first sensor means in a direction away from said flat panel;
   said second sensor means forming a sensing plane for detecting that the touch input member has approached toward said first sensor means and thereby selecting one of said display elements, before inputting the selected display element and before said touch input member is detected by said first sensor means; and
   means responsive to said second sensor means selecting one of said display elements for displaying a cursor on said display means at a position corresponding to the position of said touch input member relative to said flat panel as detected by said second sensor means so that the cursor and the image of said one of said display elements overlap each other on said display means before the touch input member is detected by said first sensor means.

2. A touch panel input device according to claim 1, wherein said second sensor means includes a plurality of optical element pairs, each pair being made up of a light emitting element for emitting a light beam and a photodetector receiving the light beam from said light emitting element for converting said light beam into an electrical signal.

3. In a touch panel input device including display means, substantially-transparent input means disposed over the display screen of the display means and displaying a plurality of images of display elements to be inputted, first sensor means for detecting an input operation of a selected display element at the input means, and control means for instructing said display means to display an inputted image of the selected display element in accordance with positional information of the input operation obtained by the first sensor means, the improvement in said touch panel input device to separately indicate element selection and subsequent element inputting, comprising;
   second sensor means for detecting the position of a finger or rod-shaped member placed over said input means and thereby detecting the selection of a display element before inputting the selected display element; and selection position displaying means for displaying the position of the selected display element detected by said second sensor means, on the display screen of the display means, to indicate a position relative to said images where the finger or rod-shaped member will subsequently perform an input operation, so as to display selection in accordance with the movement of said finger or rod-shaped member before inputting and before displaying input.

4. A touch panel input device according to claim 3, wherein said second sensor means includes a plurality of optical element pairs each made up of a light emitting element for emitting a light beam and a photo-detector receiving the light beam from said light emitting element, said optical element pairs are arranged so that light beams generated by said optical element pairs lie on a plane parallel to said input means and are divided into first parallel beams and second parallel beams, and said first parallel beams intersect with said second parallel beams, to be able to detect the position of the finger or rod-shaped member having approached toward said input means.

5. A touch panel input device according to claim 4, wherein said first sensor means includes a plurality of optical element pairs each made up of a light emitting element for emitting a light beam and a photo-detector receiving the light beam from said light emitting element, and said optical element pairs are arranged so that light beams generated by said optical element pairs are divided into first parallel beams and second parallel beams, and said first parallel beams intersect with said second parallel beams.

6. A touch panel input device according to claim 4, wherein said first sensor means detects the position of an operator's finger on said input means, on the basis of a change in electrostatic capacitance due to a light touch of the operator's finger with said input means, to form an electrostatic capacitance type touch panel of said first sensor means and said input means.

7. A touch panel input device according to claim 4, including a substantially-transparent sheet having elasticity and disposed between said first sensor means and said second sensor means so that said sheet is parallel to said sensing plane, and wherein each of said first and second sensor means includes a plurality of optical element pairs each made up of a light emitting element for emitting a light beam and a photodetector receiving the light beam from said light emitting element, and light beams in said first sensor means form substantially the same matrix as formed by light beams in said second sensor means, and wherein said sheet is so flexible that a matrix plane formed by the light beams in said first sensor is traversed by said sheet when said input means applies a force of 50 to 100 gf to said sheet.

* * * * *